United States Patent
Esslinger

(10) Patent No.: US 6,621,035 B2
(45) Date of Patent: Sep. 16, 2003

(54) WELDING DEVICE WITH AXIAL INDEXING MECHANISM

(75) Inventor: Thomas Esslinger, Alstead, NH (US)

(73) Assignee: Bore Repair Systems, Inc., Alstead, NH (US)

( * ) Notice: Subject to any disclaimer, the term of this patent is extended or adjusted under 35 U.S.C. 154(b) by 16 days.

(21) Appl. No.: 09/927,025

(22) Filed: Aug. 9, 2001

(65) Prior Publication Data

US 2003/0029844 A1 Feb. 13, 2003

(51) Int. Cl.$^7$ ................................................ B23K 9/04
(52) U.S. Cl. ............................ 219/76.14; 219/125.11
(58) Field of Search ....................... 219/76.14, 125.11; 228/25, 29, 45

(56) References Cited

U.S. PATENT DOCUMENTS

| | | | |
|---|---|---|---|
| 3,209,119 A | * 9/1965 | Keidel et al. ............. 219/73.21 |
| 3,430,837 A | 3/1969 | Hein ........................... 228/53 |
| 3,433,925 A | * 3/1969 | Benfield ................. 219/137.42 |
| 3,541,298 A | 11/1970 | Carkhuff ................. 219/137.63 |
| 3,594,534 A | 7/1971 | Benfield ................. 219/125.11 |
| 3,627,973 A | 12/1971 | Smith ..................... 219/124.4 |
| 4,381,440 A | 4/1983 | Madewell .................... 219/62 |
| 4,527,039 A | 7/1985 | Füwesi .................... 219/76.14 |
| 4,687,899 A | 8/1987 | Acheson .................. 219/76.14 |
| 4,805,826 A | 2/1989 | Moriki et al. ................. 228/18 |
| 4,851,639 A | 7/1989 | Sugitani et al. ......... 219/124.34 |
| 4,873,419 A | 10/1989 | Acheson .................. 219/125.1 |
| 4,892,990 A | 1/1990 | Acheson .................. 219/76.14 |
| 4,952,769 A | 8/1990 | Acheson .................. 219/76.14 |
| 4,956,540 A | 9/1990 | Kohno et al. ............... 219/127 |
| 5,298,710 A | 3/1994 | Acheson et al. ......... 219/76.14 |
| 5,558,268 A | 9/1996 | Acheson ...................... 228/29 |
| 5,844,201 A | 12/1998 | Dibacco et al. ........ 219/137.43 |
| 6,137,076 A | * 10/2000 | Esslinger et al. ........ 219/76.14 |
| 6,284,995 B1 | * 9/2001 | Esslinger et al. ........ 219/76.14 |
| 6,448,531 B1 | * 9/2002 | Esslinger et al. ........ 219/76.14 |
| 6,486,438 B1 | * 11/2002 | Esslinger ............... 219/125.11 |

* cited by examiner

Primary Examiner—Kuang Y. Lin
Assistant Examiner—Kevin P. Kerns
(74) Attorney, Agent, or Firm—Davis & Bujold, P.L.L.C.

(57) ABSTRACT

A welding device that facilitates depositing of a welding bead on a surface to be built-up. The welding device includes a housing accommodating a rotatable spindle therein, a drive mechanism coupled to the spindle to facilitate rotation thereof, and a second rider circumscribing the spindle and supporting a second gripper member. The second gripper member surrounds the spindle and allows the second rider to move axially with respect to the spindle in one direction but prevents axial movement of the second rider with respect to the spindle in an opposite direction. A first rider also circumscribes the spindle and is located between the driven mechanism and the second rider. The first rider supports a first gripper member that surrounds the spindle and allows the spindle to move axially with respect to the first gripper member in one direction but prevents axial movement of the spindle with respect to the first gripper member in an opposite direction. The second rider, when the second gripper member is in an operative position, induces axial movement of the spindle upon rotation thereof.

23 Claims, 12 Drawing Sheets

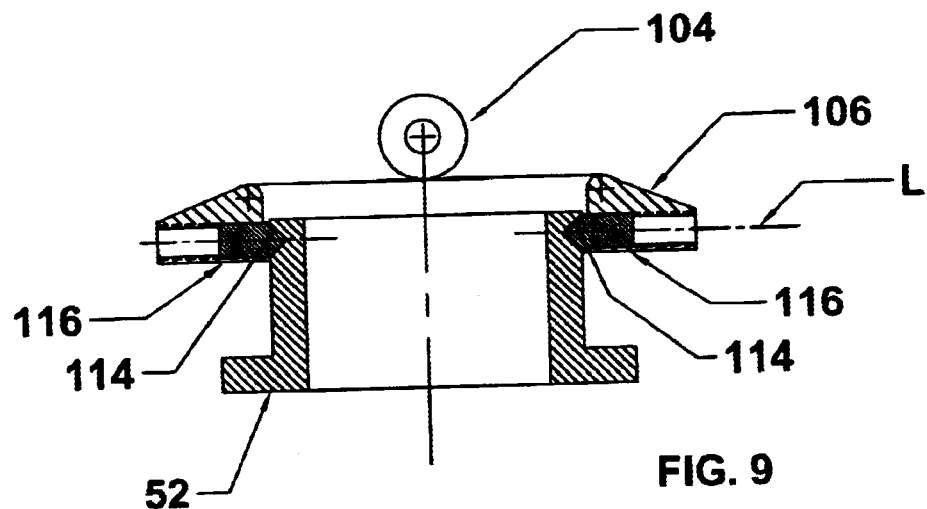
FIG. 9
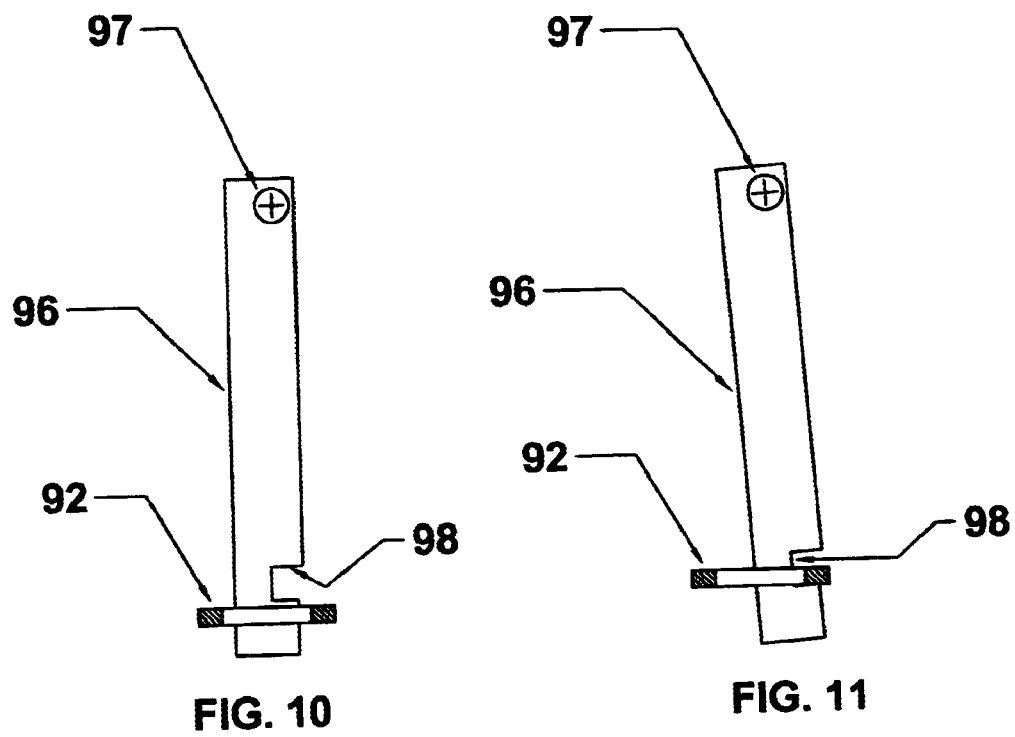
FIG. 10
FIG. 11

6,621,035 B2

WELDING DEVICE WITH AXIAL INDEXING MECHANISM

FIELD OF THE INVENTION

The present invention relates to an improvement concerning welding devices, and in particular MIG welding devices, which facilitate a desired axial indexing or movement of a welding tip of the welding device as a spindle of the welding device rotates.

BACKGROUND OF THE INVENTION

A wide variety of machinery exists throughout the world which is exposed to abrasive and stressful conditions. Large work loads, open and corrosive conditions and usage contribute to wearing down of surfaces, such as planar surfaces, bearing surfaces and/or cylindrical surfaces. Once these surfaces become sufficiently worn, they typically require refurbishing and/or repair. For large planar surfaces, bearing surfaces or cylindrical surfaces, there is often a need to build-up material prior to machining the surface back to its original configuration or dimensions. Various attempts have been made to provide automated machinery for depositing a welding bead on an inner bore or other surface, in a uniform manner, to facilitate refurbishing and/or repair of that surface.

SUMMARY OF THE INVENTION

Therefore, it is an object of the present invention to overcome the above mentioned shortcomings and drawbacks associated with the prior art refurbishing and/or repair machinery.

A further object of the present invention is to provide an axial indexing mechanism which facilitates axial movement of the spindle, of a welding device, as the spindle rotates relative to a housing to facilitate formation of a semispherical or semihelical welding bead.

Yet another object of the invention is to provide a control system which facilitates accurate control of the degree or amount of axial movement of the spindle, with respect to the housing, as the spindle rotates during operation.

A further object of the present invention is to provide a latch which facilitates disengagement of the axial indexing or movement mechanism of the spindle, with respect to the housing, so that the spindle can rotate without any axial movement being induced thereon.

Another object of the present invention is to provide a rotary welding device that is easy to set up and provides a very uniform build-up of material on the desired surface, typically a cylindrical surface.

A still further object of the present invention is to provide a rotary welding device with controllable axial movement which is relatively inexpensive to manufacture but is durable, dependable and relatively easy to use.

The present invention relates to a welding device for facilitating deposit of a welding bead on a surface to be built-up, the welding device comprising a housing accommodating a rotatable spindle therein; a drive mechanism coupled to the spindle to facilitate rotation thereof; and a second rider circumscribing the spindle and the second rider, when in the operative mode, inducing axial movement of the spindle, with respect to the housing, as the spindle rotates with respect to the housing.

The present invention also relates to a method of facilitating deposit of a welding bead on a surface to be built-up, the method comprising the steps of: accommodating a rotatable spindle within a housing; coupling the spindle to a drive mechanism for supplying rotational drive thereto and facilitate rotation thereof; and circumscribing the spindle with a second rider, and providing the second rider with both an operative mode and an inoperative mode, and the second rider, when in the operative mode, inducing axial movement of the spindle with respect to the housing as the spindle rotates with respect to the housing; and the second rider, when in the inoperative mode, sliding axially with respect to the spindle without inducing any axial movement of the spindle, with respect to the housing, as the spindle rotates with respect to the housing.

BRIEF DESCRIPTION OF THE DRAWINGS

The invention will now be described, by way of example, with reference to the accompanying drawings in which:

FIG. 9 is a diagrammatic cross sectional view showing the pivotal support of the annular ring by the second bushing;

FIG. 10 is a diagrammatic partial cross sectional view of the latch shown in its disengaged inoperative position;

FIG. 11 is a diagrammatic partial cross sectional view of the latch shown in its engaged operative position;

DETAILED DESCRIPTION OF THE INVENTION

Turning now to FIGS. 1–4, a detailed description concerning the various components comprising the present invention will first be provided and this description will then be followed by a detailed discussion concerning the function of each of the various individual components.

In the following description, the specification makes reference to the Figures and uses the terminology "vertically upward" or "vertically downward". The term "vertically upward" means towards the top of the Figure while the term "vertically downward" means toward the bottom of the Figure.

Figure 1:
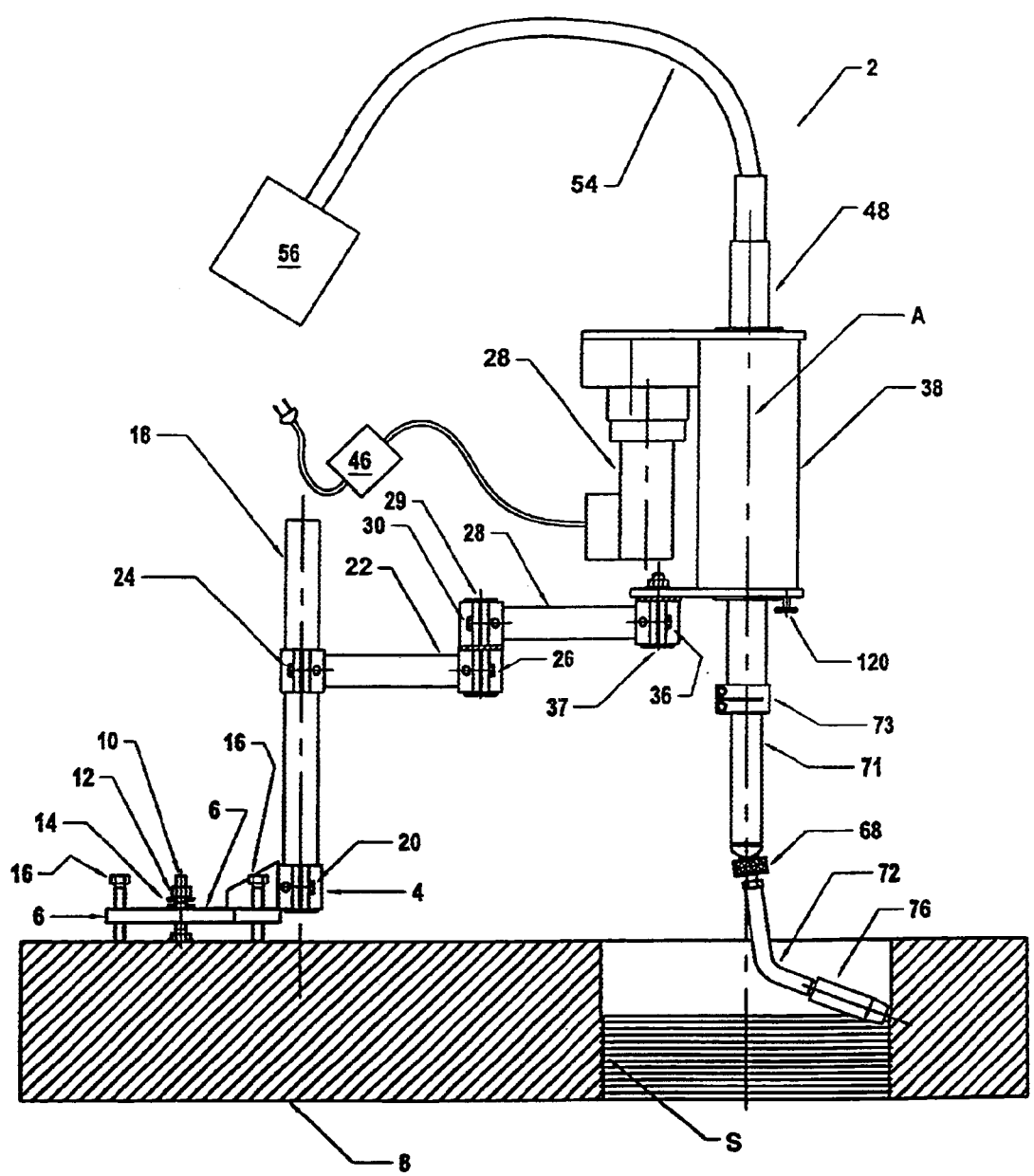
FIG. 1 is a diagrammatic perspective view of a welding device according to the present invention.
Figure 2:
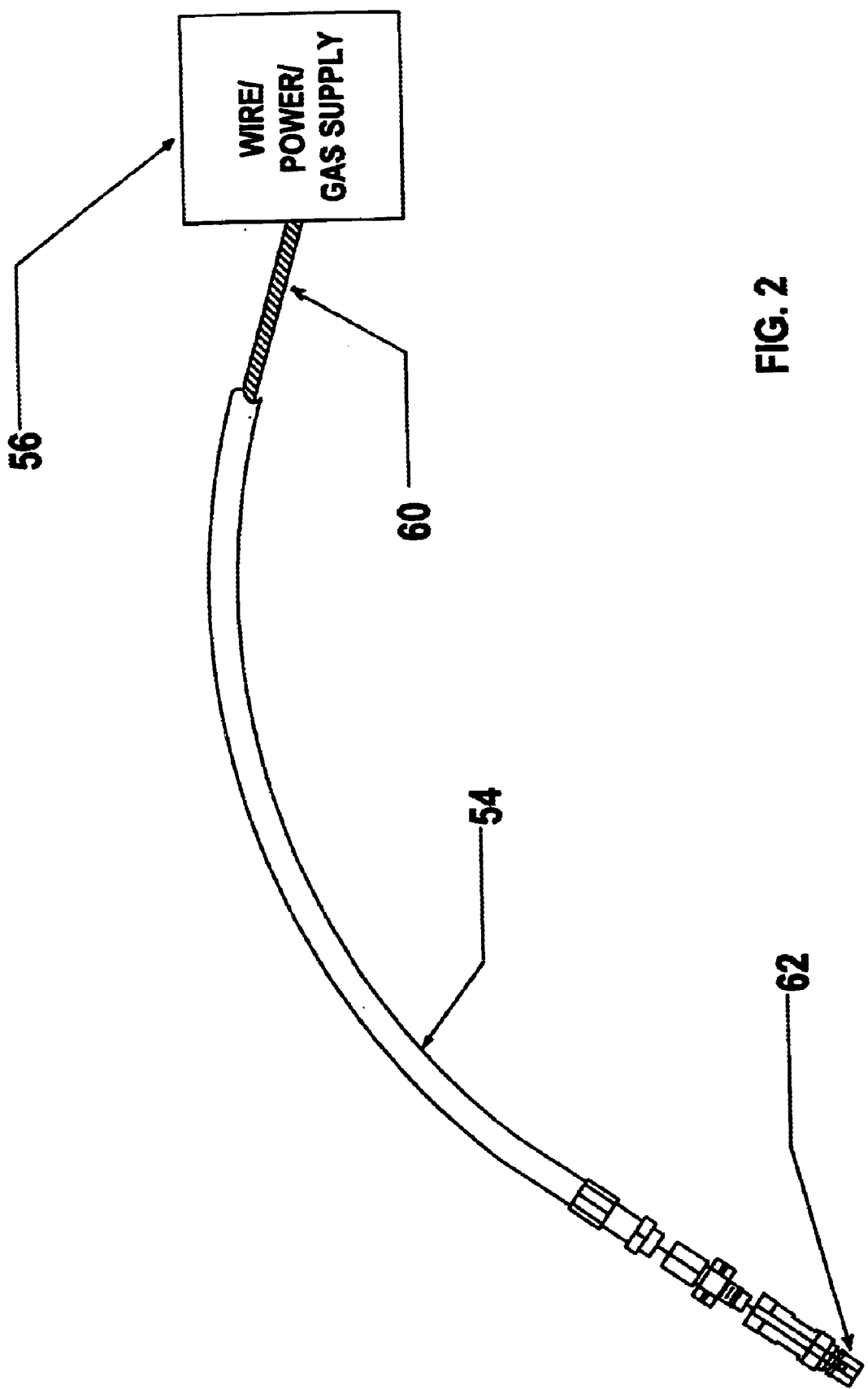
FIG. 2 is a diagrammatic perspective view, shown partly in cross section, of the upper section of the welding supply mechanism of the welding device.
Figure 3:
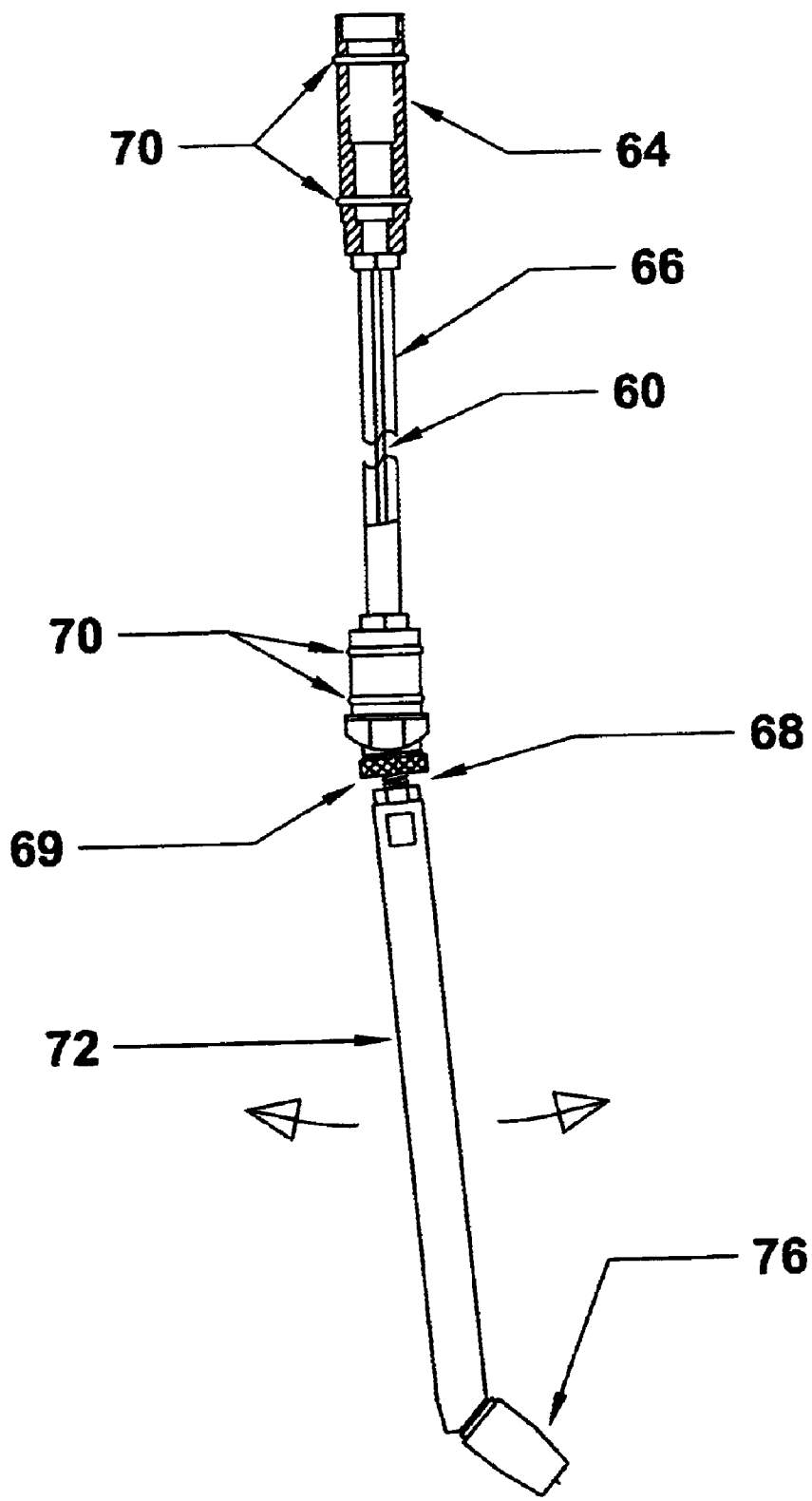
FIG. 3 is a diagrammatic partial cross sectional view of the lower section of the welding supply mechanism of the welding device.

As can be seen in FIG. 1, the welding device 2 generally comprises a support apparatus 4 for supporting the welding device 2 during use. The support apparatus 4 comprises a base bracket 6 for mounting the support apparatus 4 to a desired surface such as a table 8 or some other platform. A bolt 10 is welded or otherwise permanently secured to the top surface of the table 8 and the base bracket 6 has a central aperture which receives a free threaded end of the bolt 10. A nut 12 threadingly engages with the threaded end of the bolt 10 and biases the base bracket 6, via a spring 14, e.g. two sets of back to back arranged cup springs located between the nut 12 and the base bracket 6, toward the table 8. A plurality of perimeter threaded holes, e.g three or four threaded holes, are provided in the base bracket 6 and each one of these perimeter threaded holes receives a threaded screw 16 therein so that the free end of each threaded screw 16 engages with the top surface of the table 8. Suitable adjustment of the threaded screws 16 facilitates aligning the base bracket 6, and thus the welding device 2, in a desired orientation with respect to the table 8.

An edge portion of the base bracket 6 supports, via a conventional clamp 20, a vertically extending post 18. A first end of a first leg 22 is connected to the vertically extending post 18, at a desired vertical height, via a second conventional clamp 24 while a remote second end of the first leg 22 supports a third conventional clamp 26. A first end of a second leg 28 supports a fourth conventional clamp 30 and the third and fourth conventional clamps 26, 30 are coupled to one another, by a conventional pivot member 29, to allow relative pivoting motion between the first and second legs 22, 28. The second end of the second leg 28 pivotally supports a fifth conventional clamp 36, and a housing 38 of the welding device 2 and the fifth conventional clamp 36 are coupled to one another, by a conventional pivot member 37, to allow relative pivoting motion between the welding device 2 and the second leg 28. The connections of the vertically extending post, the first and second legs 22, 28, and the housing 38 facilitate positioning of the welding device 2 in a variety of different positions without having to move the base bracket 6.

The housing 38 has a motor 40 (see FIG. 5) mounted thereto for providing rotational motion to the welding device 2. The motor 40 has an output shaft which is connected to a drive sprocket 42 by a conventional torque limiting clutch 44. The torque limiting clutch 44 limits the amount of torque supplied by the motor 40 to the drive sprocket 42. A remote control box 46 (see FIG. 1) is electrically coupled to the motor 40 and the remote control box 46 is supplied with electrical power via an electrical cord (not numbered). The control box 46 is provided with a conventional speed controller (not shown) for controlling the rotating speed of the motor 40 as well as a conventional ON/OFF switch (not shown) to facilitate turning the motor 40 of the welding device 2 "on" and "off", as required by the operator. As these components are conventional and well known in the art, a further detailed description concerning the same is not provided.

The housing 38 of the welding device 2 accommodates a variety of internal components. A spindle 48 extends axially through the housing 38 and a first upper bushing 50 accommodates an upper portion of the spindle 48 while a second lower bushing 52 accommodates a lower portion of the spindle 48. The first and second bushings 50, 52 providing bearing surfaces which allow the spindle 48 to rotate relative to the housing 38.

The spindle 48 is generally hollow and has opposed first and second open ends. A welding assembly is accommodated within the internal space defined by the spindle 48 and the welding supply mechanism generally comprises an upper section (see FIG. 2) and lower section (see FIGS. 3 and 4). A wire/power/gas feed conduit 54 has a first end connected to a conventional wire/power/gas supply 56 while a second end thereof is connected to an adapter which supports a retaining ring and a stationary current transfer connector 62 (i.e. a male electrical connector). A welding wire guide 60 is located within the wire/power/gas feed conduit 54 for guiding a welding wire from the wire/power/gas supply 56 along the length of the wire/power/gas feed conduit 54. A welding gas is supplied from the wire/power/gas supply 56 through the wire/power/gas feed conduit 54, via a passage formed between the exterior surface of the welding wire guide 60 and an inwardly facing surface of a plastic liner (not numbered) surrounding the welding wire guide 60, while the electrical current is supplied from the wire/power/gas supply 56 to the stationary current transfer connector 62 via a copper (e.g. mesh) conductor circumscribing the plastic liner and embedded in an outer rubber covering of the wire/power/gas feed conduit 54.

The stationary current transfer connector 62 (see FIGS. 3 and 4) is received within an aperture (not numbered) of a rotatable current transfer connector 64, i.e. a female connector, supported at one end of a transfer tube 66. The opposite end of the transfer tube 66 supports a swivel bearing 68. A plurality of annular recesses are formed in an exterior surface of the transfer tube 66 and each one of these annular recesses accommodates an O-ring 70. The O-rings 70 facilitate retention of the transfer tube 66 within a protective tube 71 (see FIG. 4) while also spacing an exterior surface of the transfer tube 66 from an inwardly facing surface of the protective tube 71 to insulate the electrical conductive transfer tube 66 from the non-electrically conductive protective tube 71. That is, electricity travels from the rotatable current transfer connector 64 along the length of the electrical conductive transfer tube 66 to the swivel bearing 68 and not through the protective tube 71.

A second segment of the welding wire guide 60 is accommodated within the transfer tube 66 and this segment facilitates guiding the welding wire along the length of the transfer tube 66. The welding gas is supplied through the transfer tube 66 via a passage formed between the exterior surface of the welding guide wire 60 and the inwardly facing surface of the transfer tube 66. At least one of the stationary and rotatable current transfer connectors 62, 64 has at least one internal O-ring seal (not shown) to prevent the welding gas from escaping via the connection between the two transfer connectors 62, 64. The lower section of the welding supply mechanism is received within the spindle 48 and a clamp 73, fixedly supported by a vertically downward facing end of the spindle 48, couples the protective tube 71 of the lower section of the welding supply mechanism to the spindle 48.

Figure 4:
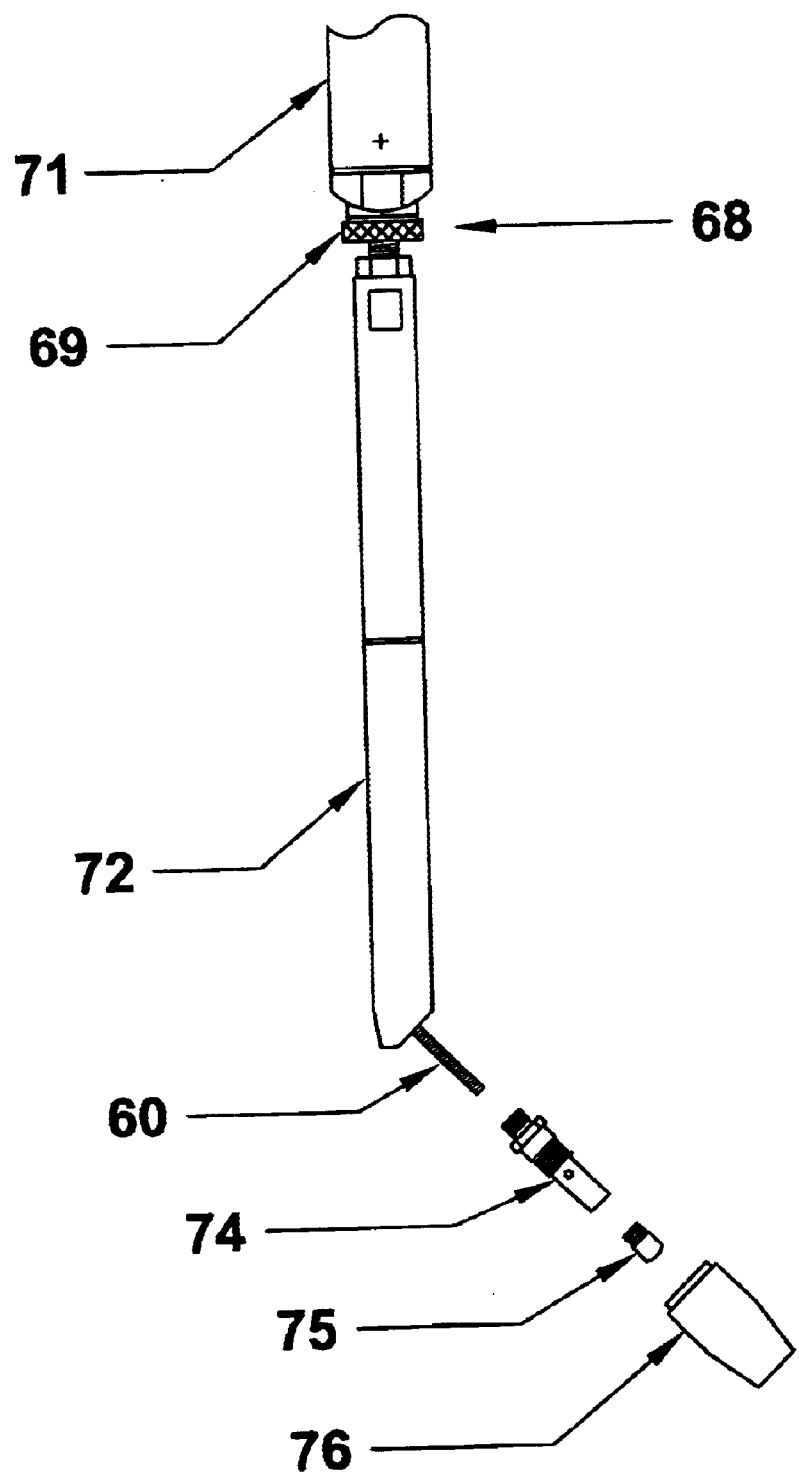
FIG. 4 is a diagrammatic exploded view of the components of the pivot tube of the lower section of the welding supply mechanism.

A first end of a pivot tube 72 is connected to the swivel bearing 68 while a remote end of the pivot tube 72 supports a gas diffuser 74 (see FIG. 4). A locking coupler 69 is provided to facilitate adjustment of the pivot tube 72 relative to the transfer tube 66 and locking of the pivot tube 72 in an adjusted position. A welding tip 75 is attached to the gas diffuser 74 and a welding nozzle 76 is connected to the gas diffuser 74 and surrounds the welding tip 75. A flexible wire guide 60 extends from the swivel bearing 68 through the pivot tube 72 to the gas diffuser 74 to supply welding wire thereto. The welding gas is supplied through the pivot tube 72 via a passage formed between the exterior surface of the flexible guide wire 60 and the inwardly facing surface of the pivot tube 72. The electrical current is transferred from the swivel bearing 68 to the electrically conductive pivot tube 72, the gas diffuser 74, the welding tip 75 and finally transferred to the object to be welded. The welding gas, the welding wire and the electricity all converge at the welding tip 75 to facilitate formation of a welding bead on the surface to be welded in a conventional manner. If desired, the pivot tube 72 may be formed from at least two separate segments joined together end to end with one another to form the pivot tube.

A hub 78 circumscribes an exterior surface of the first bushing 50 and is rotatable with respect to the first bushing 50 via bearing surfaces. The hub 78 supports a driven sprocket 82. A friction minimizing or reducing component 79, such as a thrust bearing, is located between a downwardly facing surface of the first bushing 50 and an upwardly facing surface of the hub 78. An inwardly facing surface of the hub 78 has a key way (not shown) and an outwardly facing surface of the spindle 48 has a mating key way (not shown) and a key (not shown) is accommodated in the key ways of the spindle 48 to the hub 78 to couple the spindle 48 to the hub 78. The hub key is held in position by a set screw (not shown). A drive member 80, such as a chain, interconnects the drive sprocket 42 with the driven sprocket 82 to supply rotational drive to the spindle 48. Due to this arrangement, as the drive sprocket 42 supplies rotational drive to the driven sprocket 82, such rotation is, in turn, conveyed to the spindle 48 via the hub 78, the key and the key ways. To facilitate adjustment of the tension of the drive member 80, the motor 40 is attached to a motor mount 81 which is movable to and for, in a conventional manner, relative to the spindle 48. The motor mount 81 also functions as an exterior guard for the drive member 80. If desired, a chain guard (not shown) can be provided adjacent to the driven sprocket 82 to minimize the possibility of an operator having his fingers or hand caught between the drive member 80 and the driven sprocket 82.

The spindle 48 also supports a first rider 84 vertically beneath the hub 78. An inwardly facing surface of the first rider 84 has a key way (not shown) and an outwardly facing surface of the spindle 48 has a mating key way (not shown) and a first rider key (not shown) is accommodated in the key ways of the spindle 48 and the first rider 84 to couple the spindle 48 to the first rider 84. The first rider key is held in position by a set screw (not shown).

A lower portion of the first rider 84 supports a pivotal first gripper member 86. A first end of the gripper member 86 is pivotally supported by a lower portion of the first rider 84, via a first retaining lip 87, while a second opposed end of the first gripper member 86 is biased vertically downward away from a base 89 of the first rider 84 by a first gripper spring 88. The first gripper member 86 has a central aperture which is slightly larger in diameter than the diameter of the spindle 48, e.g. larger by 0.003 to 0.015 of an inch or so, to facilitate sliding movement of the spindle 48 with respect to the first gripper member 86. By this arrangement, when the first gripper member 86 is aligned in a plane P extending parallel to the base 89 of the first rider 84 and substantially perpendicular to a longitudinal axis A defined by the spindle 48, the first gripper member 86 permits and does not inhibit vertically upward sliding movement of the spindle 48 with respect to the first rider 84. However, when the first gripper member 86 is pivoted out of the plane P extending substantially perpendicular to the longitudinal axis A defined by the spindle 48 and becomes skewed with respect to the base 89 of the first rider 84, the first gripper member 86 bites into the outer surface of the spindle 48 to prevent vertically downward sliding motion of the spindle 48 with respect to the first rider 84.

The spindle 48 also supports a second rider 90 which is supported adjacent but vertically below the first rider 84. An inwardly facing surface of the second rider 90 has a key way (not shown) and an outwardly facing surface of the spindle 48 has a mating key way (not shown) and a second rider key (not shown) is accommodated in the key ways of the spindle 48 and the second rider 90 to couple the spindle 48 to the second rider 90. The second rider key is held in position by a set screw (not shown).

A lower portion of the second rider 90 supports a second gripper member 92. A first end of the second gripper member 92 is pivotally supported by a lower portion of the second rider 90, via a second retaining lip 93 (see FIG. 16), while a second opposed end of the second gripper member 92 is biased away from a base 95 of the second rider 90 by a second gripper spring 94. The second gripper member 92 has a central aperture which is slightly larger in diameter than the diameter of the spindle 48, e.g. larger by 0.003 to 0.015 of an inch or so, to facilitate sliding movement of the second gripper member 92 with respect to the spindle 48. By this arrangement, when the second gripper member 92 is aligned in a plane P' extending parallel to the base 95 of the second rider 90 and substantially perpendicular to the longitudinal axis A defined by the spindle 48, the second gripper member 92 permits and does not inhibit vertically downward sliding movement of the second rider 90 with respect to the spindle 48. However, when the second gripper member 92 is pivoted out of the plane P' extending substantially perpendicular to the longitudinal axis A and becomes skewed with respect to the base 95 of the second rider 90, the second gripper member 92 becomes skewed and bites into the outer surface of the spindle 48 to prevent vertically upward sliding motion of the second rider 90 with respect to the spindle 48.

An upper portion of the second rider 90 pivotally supports a first end of a latch 96, via a screw 97, while a second end of the latch 96 is positioned adjacent the second gripper member 92. The second end of the latch 96 has a notch 98 or other formation to facilitate retaining the second gripper member 92 against the base 95 of the second rider 92 and in the plane P' extending substantially perpendicular to the longitudinal axis A. When the latch 96 is in its latched operative mode or position (see FIG. 11), the notch 98 or other formation retains the second gripper member 92 in the plane P' extending substantially perpendicular to the longitudinal axis A. Due to latching of the second gripper member 92, the second rider 90 is free to move vertically upward and vertically downward relative to the spindle 48 and does not induce movement on the spindle 48. When the latch 96 is in its disengaged inoperative mode or position (see FIG. 10), i.e. the notch 98 or other formation is spaced from the second gripper member 92, the second gripper member 92 only allows the second rider 90 to move vertically downward relative to the spindle 48 but prevents vertically upward movement of the second rider 90 relative to the spindle 48.

A vertically downward facing portion of the second rider 90 supports a cam member 100 via a threaded bolt 102. This cam member 100 also supports the second retaining lip 93 (see FIG. 16). A remote end of the cam member 100 includes a rotatable cam wheel 104 which is positioned to engage with and roll along a cam surface 106 formed on a top surface of an annular ring 108.

A base surface 112 of the housing 38 supports the second bushing 52 and the spindle 48 extends through a central hole provided in the second bushing 52. An outwardly facing surface of the second bushing 52 has a pair of opposed recesses 114 (see FIG. 9). The annular ring 108 has a pair of opposed set screws 116 which are threaded into bores formed in the annular ring 108 180° with respect to one another. The pair of set screws 116 engage with the pair of opposed recesses 114, formed in the second bushing 52, and facilitate pivoting motion of the annular ring 108 about a central pivot axis L defined by the pair of opposed set screws 116 and recesses 114. In order to confine pivoting motion of the annular ring 108 with respect to the central pivot axis L, an adjustment screw 120 passes through a threaded bore formed in a base surface 112 of the housing 38 (see FIGS. 5–8) and a remote end of the adjustment screw 120 abuts against a downwardly facing undersurface of the annular ring 108. An opposed compression spring 122 is located 180° with respect to the adjustment screw 120 and a first end of the compression spring abuts against the downwardly facing undersurface of the annular ring 108 while a second end of the compression spring 122 engages with the base surface 112 of the housing 38.

As the adjustment screw 120 is threaded into the threaded bore, formed in the base surface 112 of the housing 38, the remote end of the adjustment screw 120 abuts against the undersurface of the annular ring 108 and causes the annular ring 108 to pivot, about pivot axis L, toward a more horizontal orientation, e.g. decrease the degree of pitch or inclination of the cam surface 106. Such pivoting motion of the annular ring 108 causes the compression spring 122 to become compressed. Alternatively, as the adjustment screw 120 is threaded out of the threaded bore, formed in the base surface 112 of the housing 38, the remote end of the adjustment screw 120 attempts to space itself from the undersurface of the annular ring 108. The compression spring 122, as it gradually re-expands, prevents this spacing from occurring by exerting a force on the annular ring 108 causing the annular ring 108 to pivot, about pivot axis L, towards the remote end of the adjustment screw 120, e.g. increases the degree of pitch or inclination of the cam surface 106. By this arrangement, adjustment of the adjustment screw 120 controls the inclination angle of the annular ring 108 with respect to the spindle 48. Such inclination, in turn, controls the amount of axial movement of the spindle 48 with respect to the housing 38 during each complete rotation of the welding device 2, as will be described below in further detail.

A plurality of spaced apart compression springs 110, e.g. four equally spaced compression springs, are positioned between the first and second riders 84, 90. The four equally spaced compression springs 110 bias the first and the second riders 84, 90 away from one another but allow restricted movement of the second rider 90 toward the first rider 84, e.g. the compression springs 110 facilitate axial movement of the first and second riders 84, 90 with respect to one another over a limited range of travel to vary the spacing 111 between the first and second riders 84, 90 and the purpose of limited axial travel will be described below in further detail.

It is to be appreciated that when an operator of the welding device 2 desires to move the spindle 48 with respect to both the first and second riders 84, 90, the operator first moves the latch 96 to its latched operative mode or position (FIG. 11) so that the notch 98, or other formation, retains the second gripper member 92 against the base 95 in the plane P' extending substantially perpendicular to a longitudinal axis A. Thereafter, the operator biases the first gripper member 86 so it abuts against the base 89 of the first rider 84 and lies in plane P extending substantially perpendicular to the longitudinal axis A, i.e., biases the unpivoted end of the first gripper member 86 to compress the first gripper spring 88. As both the first and second gripper members 86, 92 substantially lie in planes P or P' extending substantially perpendicular to the longitudinal axis A, the first and second gripper members 86, 92 do not hinder either vertically upward or vertically downward sliding movement of the spindle 48 with respect to the first and the second riders 84, 90. Once the spindle 48 is suitably positioned, the operator then releases the first gripper member 86 and disengages the latch 96 to release the second gripper member 92 and this procedure thus fixes the axial position of the spindle 48 with respect to the first and the second riders 84, 90.

Figure 12:
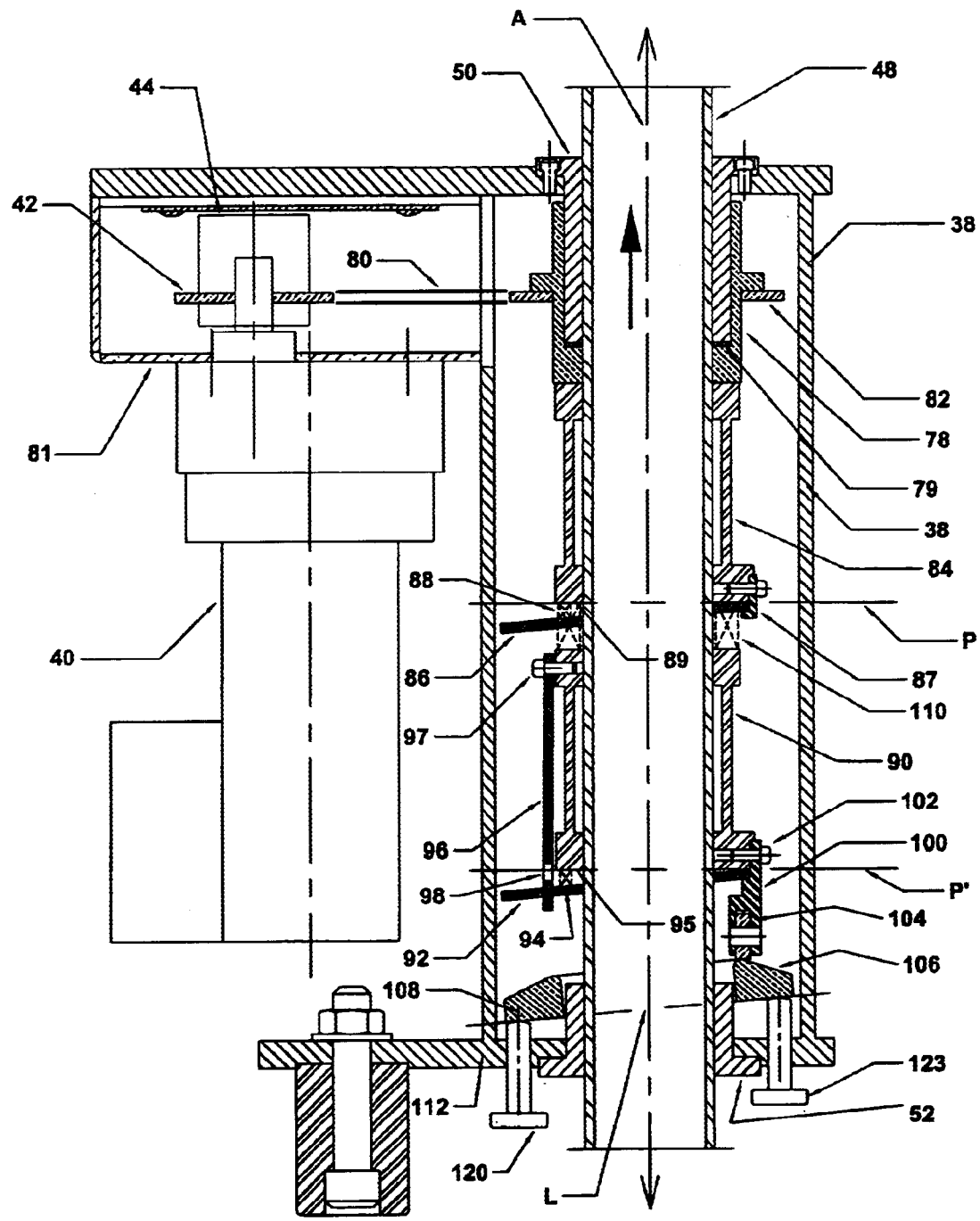
FIG. 12 is a diagrammatic partial cross sectional view showing a double jack screw arrangement for the annular ring.

Turning now to FIG. 12, a second embodiment for facilitating gradual climbing of the spindle 48 along with the second rider 90 will now be briefly described. As this embodiment is very similar to the first embodiment, only the differences between this embodiment and the first embodiment will be discussed in detail. The sole difference between this embodiment and the previous embodiment is the elimination of the compression spring 122 and substituting, in place thereof, a second adjustment screw 123. This second adjustment screw 123 is threaded into a threaded bore (not numbered), formed in the base surface 112 of the housing 38, and the remote end of the adjustment screw 123 abuts against an opposed undersurface of the annular ring 108 and causes the annular ring 108 to pivot about pivot axis L. According to this arrangement, as the first adjustment screw 120 is threaded into the threaded bore, the second adjustment screw 123 is threaded out of the bore at a corresponding distance to facilitate pivot of the annular ring 108 about its pivot axis L. The advantage of this embodiment, over the first embodiment, is that the second adjustment screw 123 will not inadvertently be depressed, by the force of the spring(s) 110, which might otherwise be possible by using the spring 122.

Figure 15:
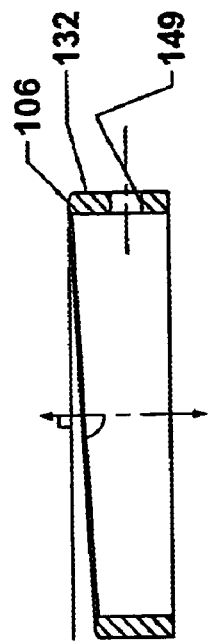
FIG. 15 is a diagrammatic cross sectional view of the rotatable cam of FIG. 13.
Figure 14:
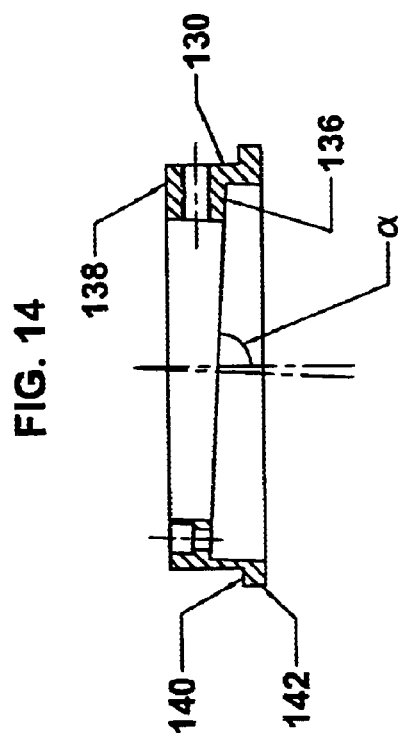
FIG. 14 is a diagrammatic cross sectional view of the cam support of FIG. 13.
Figure 13:
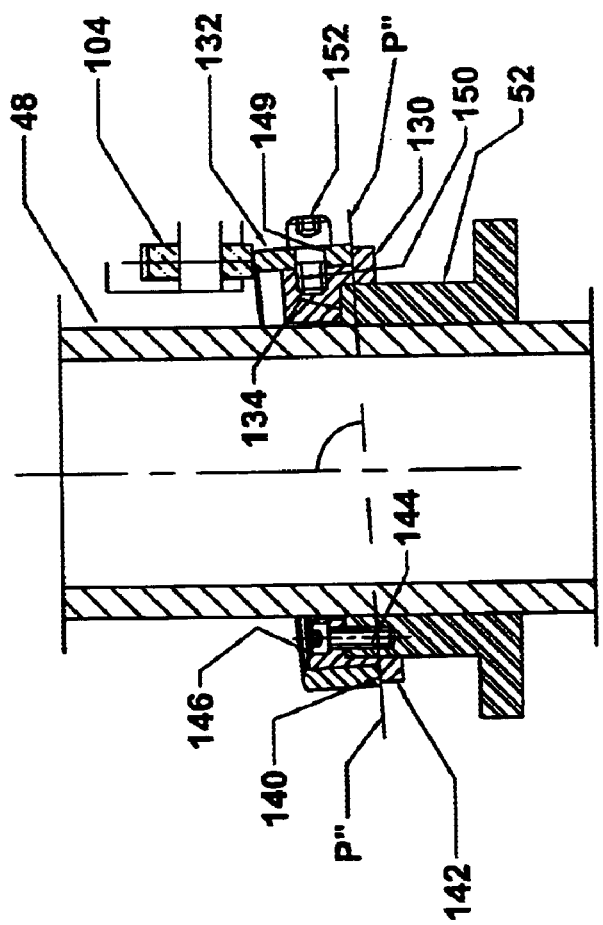
FIG. 13 is a diagrammatic partial cross sectional view showing a ramped cam to provide a rotatable cam surface for the cam member.

With reference now to FIGS. 13–15, a brief description concerning a third embodiment for facilitating gradual climbing of the spindle 48 along with the second rider 90 will now be briefly described. As this embodiment is somewhat similar to the first embodiment, only the differences between this embodiment and the first embodiment will now be discussed. According to this embodiment, the pivotable annular ring 108, the adjustment screw 120 and the compression spring 122 are replaced by a cam support 130 and a rotatable cam 132. The cam support 130 is supported by a vertically upward facing surface 134 of the lower bushing 52 and a central internal bore 136 is formed within the cam support 130 so that the axial thickness of a top wall 138 is thicker on one side than it is on an opposite side, i.e. a plane defined by a base surface of the internal bore forms an angle α of 87° with the longitudinal axis A. Due to this configuration, when the cam support 130 is resting on the lower bushing 52, as shown in FIG. 13, a vertically upward facing top surface 140 of an annular ridge 142 of the cam support 130 is inclined so as to lie in a plane P" which forms an angle of 87° with the longitudinal axis A. The lower bushing 52 is provided with an axial bore 144 and the threaded bolt 146 passes through an opening in the cam support 130 and is received within the axial bore 144 to secure the cam support 130 to the lower bushing 52 at a desired relative orientation between those two components. A plurality, e.g. three, equally spaced, axial bores 144 are provided in the lower bushing 52. The rotatable cam 132 is provided with an opening or slot 149 and the cam support 130 is provided with a radial bore 150 and a radial threaded bolt 152 is received within the radial bore to secure the rotatable cam 132 to the cam support 130 at a desired relative orientation between those two components. The vertically upward facing top surface of the rotatable cam 132 forms a cam surface 106. The rotatable cam 132 is thicker on one side than the other so that the cam surface 106 lies in a plane forming an angle of 87° with the longitudinal axis A.

Due to this arrangement, when the radial threaded bolt 152 is loosened and the rotatable cam 132 is rotated with respect to the cam support 130 such that the thickertop surfaces of the rotatable cam 132 and the cam support 130 overlap one another, the cam surface 106 of the rotatable cam 132 is inclined at an angle of 6° with respect to the longitudinal axis A of the spindle 48. However, when the rotatable cam 132 is rotated 180°, with respect to that overlapped position, the cam surface 106 of the rotatable cam 132 lies perpendicular to the longitudinal axis A of the spindle 48 such that a 0° inclination of the cam surface 106 is obtained. According to this embodiment, it is possible to vary the inclination angle of the cam surface 106 anywhere from 0 to 6 degrees by rotation of the rotatable cam 132. This arrangement results into a substantially infinite variable adjustment of the inclination angle of the cam surface 106 and results in between 0.0 and 0.26 inches of actual axial travel of the welding tip for every 360° of rotation of the spindle 48.

OPERATION OF THE WELDING DEVICE

Prior to operating the welding device 2, the operator will first check and, if necessary, adjust the degree of inclination of the annular ring 108 with respect to the longitudinal axis A. This is achieved by threading the adjustment screw 120 either into or out of the threaded bore, formed in the base surface 112 of the housing 38, so that the remote end of the adjustment screw 120 alters the orientation of the annular ring 108 and causes the annular ring 108 to pivot, about pivot axis L, e.g. increase or decrease the degree of pitch or inclination of the cam surface 106. Once this is suitably adjusted, the welding device 2 is then ready for use.

Next, the operator adjusts the position of the welding tip 75 relative to the surface 5 to be welded by pivoting the welding device 2 relative to the support apparatus 4, adjustment of the height of the welding device 2 by moving clamp 24 to a suitable position along the vertically extending post 18, pivoting of the pivot tube 72 relative to the transfer tube 66 and/or sliding the spindle 48 relative to the first and the second riders 84, 90 as discussed above and activates the motor 40 to cause rotation of the welding device 2. It is to be appreciated that the latch 96 is typically in its engaged operative mode or position (see FIG. 11) so that the notch 98, or other formation, retains the second gripper member 92 against the base 95 in the plane P' extending substantially perpendicular to the longitudinal axis A and the second rider 90 does not induce any vertical movement of the spindle 48 with respect to the housing 38. At the time that welding is initiated, the latch 96 is moved to a disengaged inoperative mode or position (see FIG. 10) to allow the second rider 90 to operate and vertically raise the spindle 48 as the spindle 48 rotates.

Figure 5:
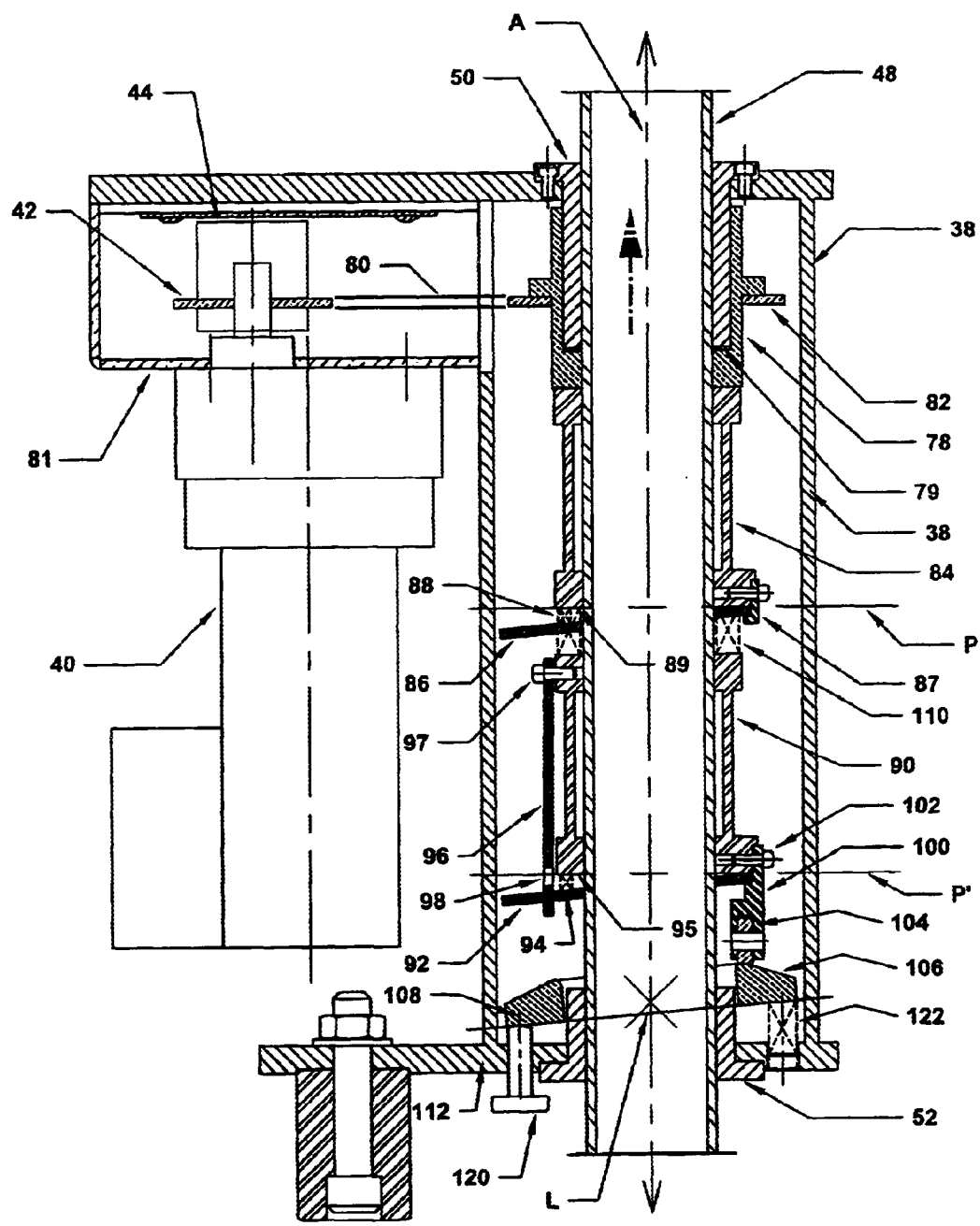
FIG. 5 is a diagrammatic partial cross sectional view showing engagement of the cam wheel with the cam surface at the peak where the cam wheel ceases its gradual vertically upward movement and commences its gradual vertically downward movement.
Figure 6:
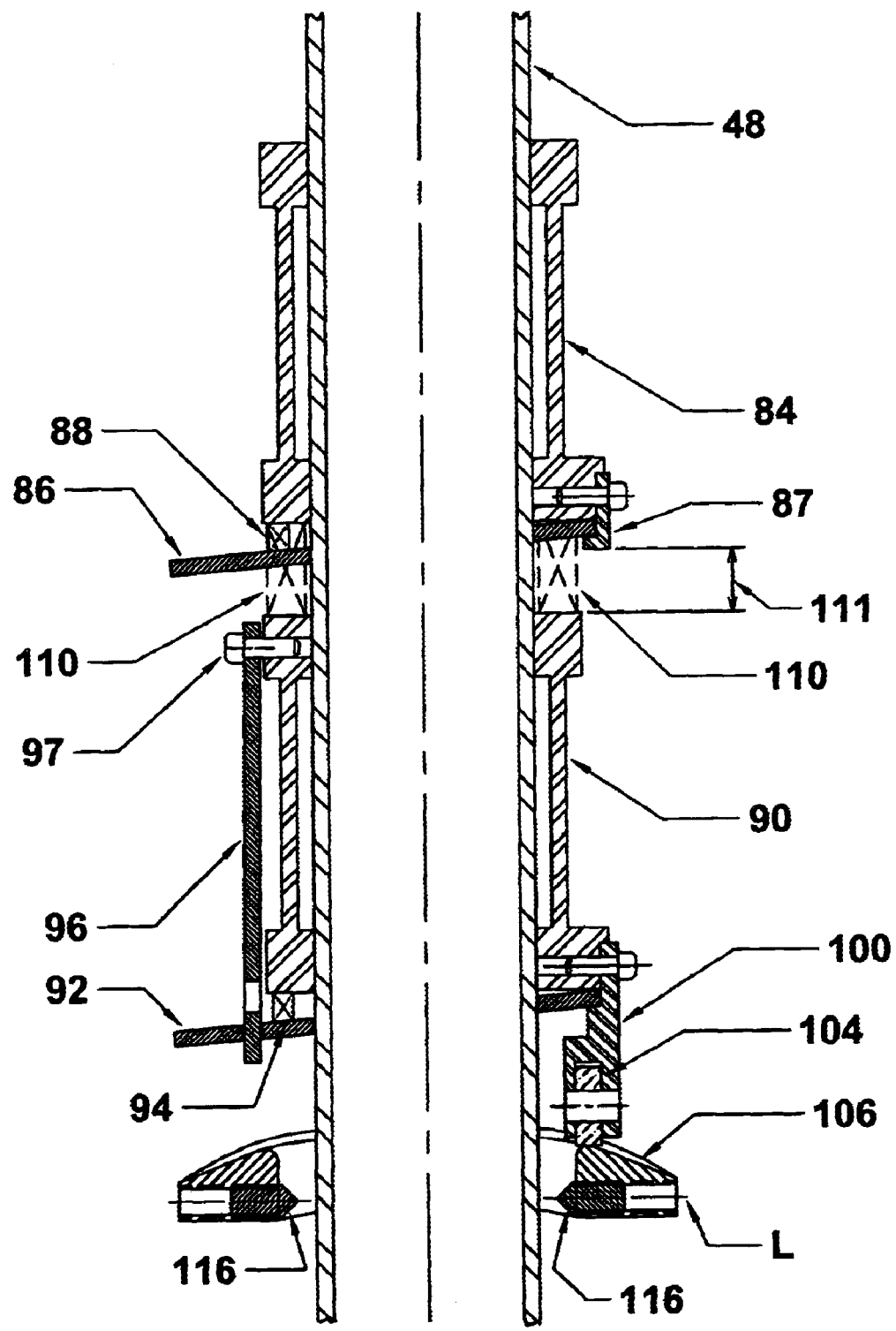
FIG. 6 is a diagrammatic partial cross sectional view showing an intermediated orientation of the cam wheel, with the cam surface, as the cam wheel is traveling vertically downward along the cam surface from the peak to the base.
Figure 7:
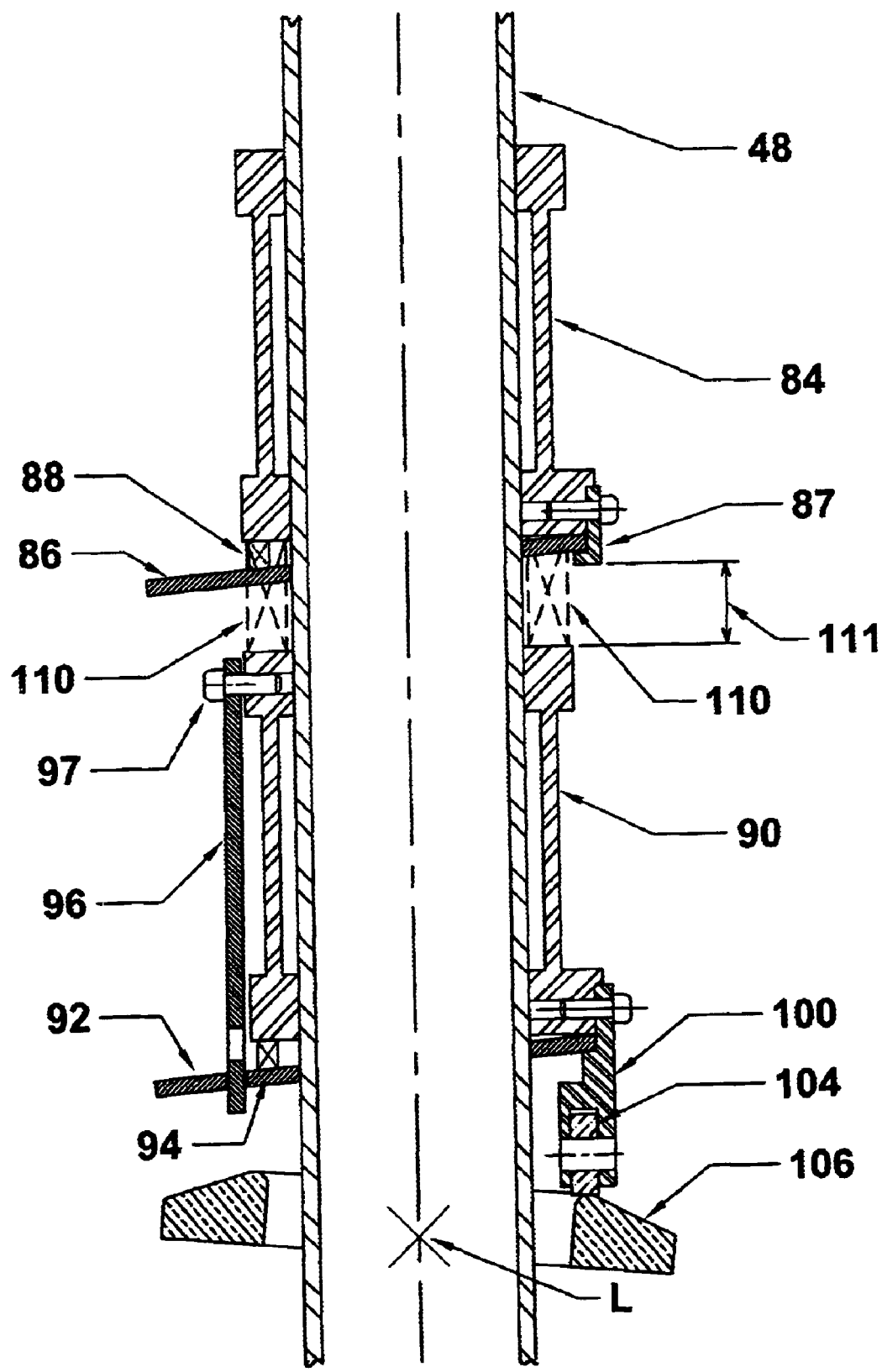
FIG. 7 is a diagrammatic partial cross sectional view showing engagement of the cam wheel with the cam surface at the base where the cam wheel ceases its gradual vertically downward movement and commences its gradual vertically upward movement.

As the cam wheel 104 rotates from the peak position shown in FIG. 5, where the spacing 111 between the first and second riders 84, 90 is a minimum spacing toward an intermediate position shown in FIG. 6, the cam wheel 104 starts to descend gradually along the cam surface 106 of the annular ring 108. During such descending motion, the second rider 90 is gradually allowed to slide vertically downward relative to and along the exterior surface of the spindle 48, e.g. the vertically downward motion of the second rider 90 relative to the spindle 48 tends to bias the second gripper member 92 toward an orientation where the second gripper member 92 is biased toward the base 95 of the second rider 90 and aligned in the plane P extending substantially perpendicular to the longitudinal axis A so that such sliding motion is not inhibited by the second gripper member 92. During this motion, the first gripper member 86 is biased by the first gripper spring 88 into a skewed orientation in which the first gripper member 86 bites into and engages with the spindle 48 to prevent vertically downward movement of the spindle 48 relative to the first gripper member 86 and the first rider 84. Such vertically downward sliding motion of the second rider 90, relative to the spindle 48, continues until the cam wheel 104 reaches the vertically lowest most point of the cam surface 106. This position is shown in FIG. 7. The compression springs 110 facilitate relative movement of the second rider 90 with respect to the first rider 84 and bias the second rider 90 away from the first rider 84 to increase the spacing 111 between the first and second riders 84, 90 to a maximum spacing.

Figure 8:
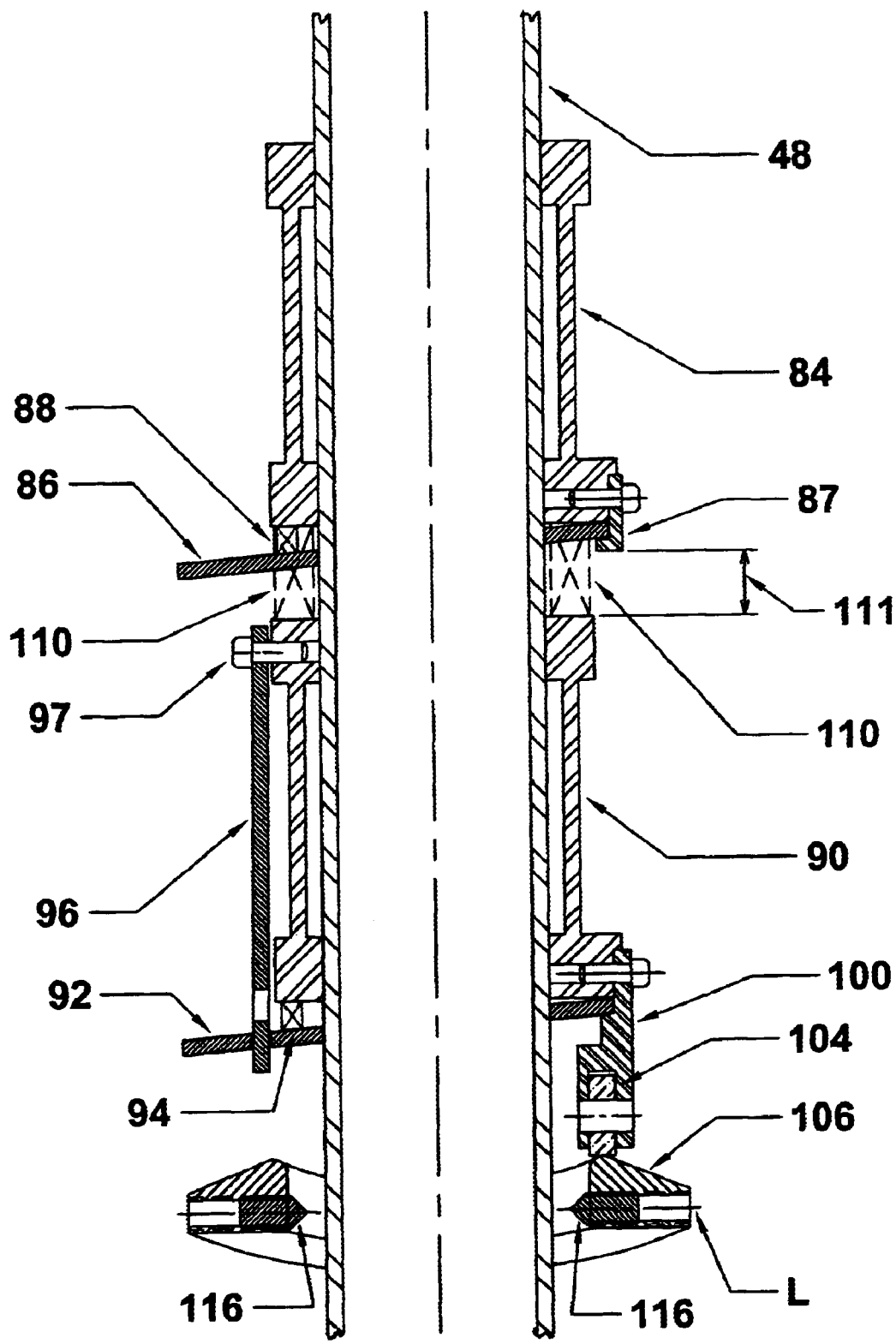
FIG. 8 is a diagrammatic partial cross sectional view showing an intermediate orientation of the cam wheel, with the cam surface, as the cam wheel is traveling vertically upward along the cam surface, from the base toward the peak, and vertically raises the spindle.

As the cam wheel 104 continues to rotate and travels toward the position shown in FIG. 8, the second rider 90 ceases moving vertically downward relative to the spindle 48 and commences a gradient vertically upward motion as the cam wheel 104 starts to roll up the inclined cam surface 106. As the cam wheel 104 commences this climbing motion, the second gripper member 92 is biased away from the base 95 of the second rider 90 and becomes skewed and thus bites into and engages with the spindle 48. Due to this engagement between the second gripper member 92 and the spindle 48, as the cam wheel 104 gradually climbs the inclined cam surface 106 over the next 180° of rotation of the spindle 48, the spindle also gradually climbs along with the second rider 90. It is to be appreciated that the first gripper member 84 does not oppose such raising motion of the spindle 48 since the vertically raising motion of the spindle 48 tends to force the first gripper member 84 toward an orientation where the first gripper member 84 is biased toward the base 89 of the first rider 84 and aligned in the plane P extending substantially perpendicular to the longitudinal axis A. Such vertically raising motion of the spindle 48 by the second rider 90 continues until the cam wheel 104 reaches its vertically most elevated peak position along the cam surface 106. This position is shown in FIG. 5. At this point, further vertically raising motion of the spindle 48 discontinues and the above process is repeated.

It is to be appreciated that as the spindle 48 rotates and the cam wheel 104 rolls vertically downward along the cam surface 106 for 180° of rotation of the spindle 48, no axial movement of the spindle 48 occurs, i.e. neither vertically upward nor vertically downward movement is induced on the spindle 48, and the welding bead formed by the welding device 2 occurs in a plane, e.g. a substantially horizontal weld bead is achieved. However, as the cam wheel 104 commences its vertically upward climbing motion along the cam surface 106, such motion induces a vertically upward axial movement of the spindle 48 which raises the welding device 2 and welding tip 75. Such vertically upward motion of the spindle 48 facilitates a gradual raising of the welding tip 75 and formation of a semispherical or semihelical welding bead on the surface 5 to be welded. The inclination angle of the annular ring 108 is an important parameter which is adjusted, by the operator, to substantially coincide with the thickness of the bead to be deposited so substantially uniform weld beads are deposited closely adjacent one another along a cylindrical surface 5 to be welded.

Figure 16:
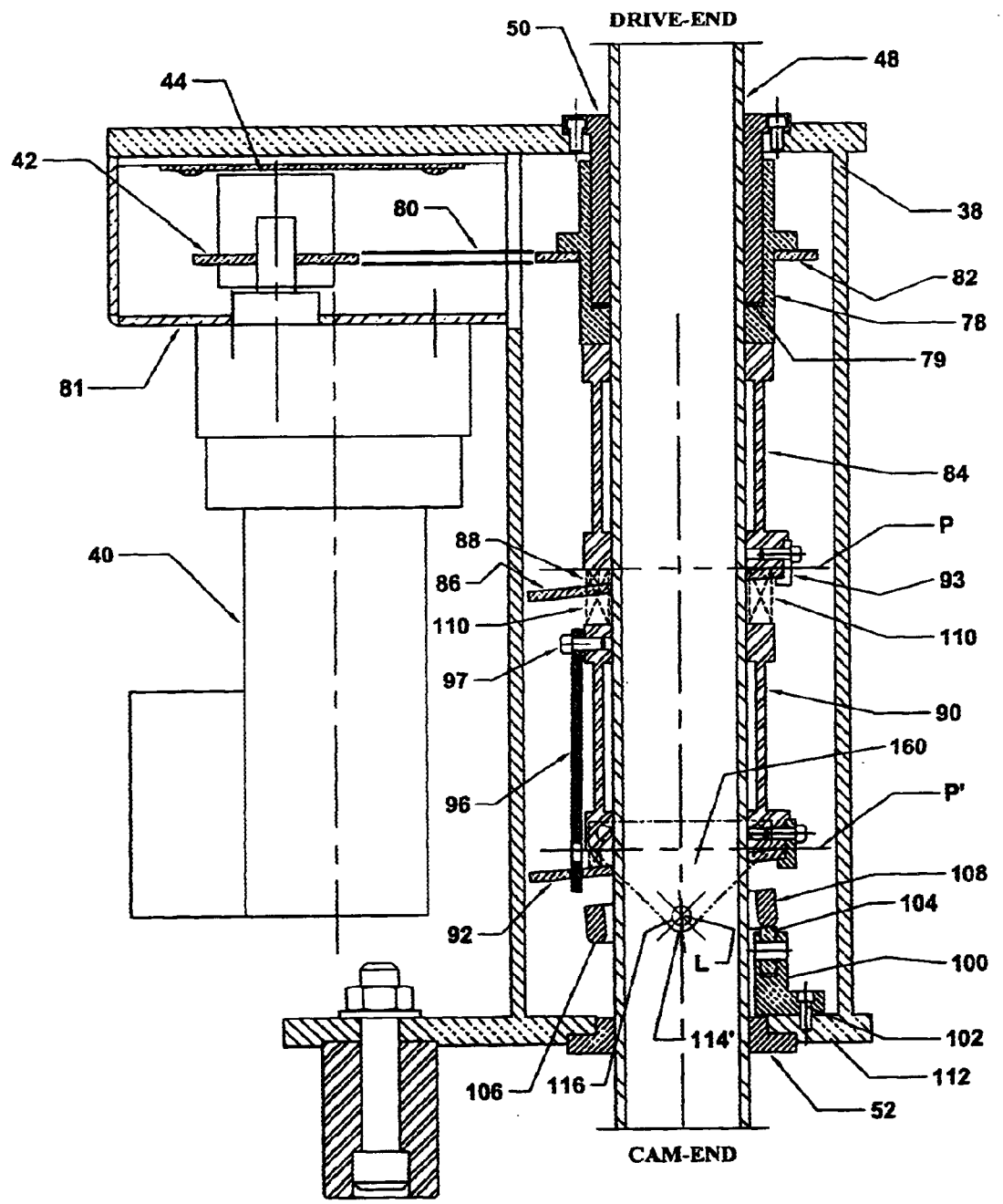
FIG. 16 is a diagrammatic partial cross sectional view showing an alternative arrangement for the cam wheel and the cam surface to facilitate gradual vertically upward movement of the spindle.

According to this embodiment, the lower portion of the second rider 90 supports a bracket 160 which has a pair of opposed recesses 114'. The annular ring 108 has a pair of opposed set screws 116 which are threaded into bores (not shown) formed in the annular ring 108 and located 180° with respect to one another. The pair of set screws 116 engage with the pair of opposed recesses 114', formed in the bracket 160, and the threaded bores to facilitate adjustment of the pivoting motion of the annular ring 108 about a central pivot axis L defined by the pair of opposed set screws 116 and recesses 114'. Similar to the previous embodiment, an adjustment screw (not shown) and an opposed compression spring (not shown) may be supported by the vertically lower portion of the second rider 90 and located 180° with respect to one another to confine pivoting motion of the annular ring 108 with respect to the central pivot axis L. Alternatively, as shown in FIG. 16, the adjustment screw and the opposed compression spring may be eliminated and the adjusted position of the annular ring 108 with respect to the central pivot axis L may be obtained by manual adjustment of the annular ring 108 and then sufficient tightening of the pair of opposed set screws 116 to the bracket 160 to maintain the adjusted position.

A base surface 112 of the housing 38 supports the cam member 100 via a threaded bolt 102. This cam member 100 includes a rotatable cam wheel 104 which is positioned to engage with and roll along the cam surface 106 formed on a vertically downward facing surface of the annular ring 108. In all other respects, this embodiment is substantially identical to the embodiment of FIG. 5.

Since certain changes may be made in the above described improved axial indexing mechanism for a welding device, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, I claim:

1. A welding device for facilitating deposit of a welding bead on a surface to be built-up, the welding device comprising:
    a housing accommodating a rotatable spindle therein;
    a drive mechanism coupled to the spindle to facilitate rotation thereof;
    a first rider circumscribing the spindle;
    a first gripper member supported by the first rider, the first gripper member surrounding the spindle such that the spindle is axially moveable with respect to the first gripper member in one direction of motion and is axially immovable with respect to the first gripper member in a second opposite direction of motion;
    a second rider circumscribing the spindle such that the first rider is between the drive mechanism and the second rider, the second rider having an operative mode in which, as the spindle rotates with respect to the housing, the second rider induces the spindle to move axially with respect to the housing, and an inoperative mode in which, as the spindle rotates with respect to the housing, the second rider slides axially with respect to the spindle without inducing axial movement of the spindle with respect to the housing;
    a second gripper member supported by the second rider, the second gripper member surrounding the spindle such that the second rider is axially moveable with respect to the spindle in one direction of motion and is axially immovable with respect to the spindle in a second opposite direction of motion; and
    at least one spring between the first rider and the second rider.

2. The welding device according to claim 1, wherein the welding device further comprises a latch pivotally connected to the second rider, the latch has a first disengaged position such that the second gripper member engages with the spindle to vertically raise the spindle with respect to the housing during rotation of the spindle, and a second engaged position such that the second gripper member is disengaged from the spindle so that the second rider is axially movable with respect to the spindle in two directions of motion to prevent raising the spindle with respect to the housing during rotation thereof.

3. The welding device according to claim 1, wherein the first rider and the second rider are mechanically coupled to the spindle so that both the first rider and the second rider are rotatably driven by the spindle.

4. The welding device according to claim 1, wherein the welding device further comprises a support apparatus for mounting the welding device to a desired surface.

5. The welding device according to claim 1, wherein the welding device further comprises:
    a motor;
    a drive sprocket supported by the motor;
    a driven sprocket supported by the spindle; and
    a drive member connects the drive sprocket with the driven sprocket to supply rotational drive to the driven sprocket and facilitate rotation of the spindle.

6. The welding device according to claim 5, wherein the welding device further comprises:
    an electric controller coupled to the motor, and the electric controller controlling a rotational speed of the motor; and
    a torque transfer device couples the motor to the drive sprocket to limit an amount of to torque transferred to the driven sprocket from the drive sprocket.

7. The welding device according to claim 1, wherein the spindle is hollow and has opposed first and second open ends, the spindle supports a transfer tube therein, the transfer tube is connected to a pivot tube by a swivel bearing, and a remote end of the pivot tube supports a welding tip to facilitate welding on a desired surface.

8. The welding device according to claim 7, wherein the swivel bearing facilitates pivoting adjustment of the pivot tube relative to the transfer tube to adjust a diameter of a weld bead to be formed on a surface to be welded, and a locking coupler facilitates locking of an adjusted pivoted position of the pivot tube relative to the transfer tube.

9. The welding device according to claim 7, wherein the transfer tube and the pivot tube are both sufficiently hollow to supply welding wire and welding gas to the welding tip, and the swivel bearing and the pivot tube are sufficiently electrically conductive to supply a welding current to the welding tip to facilitate welding on the desired surface.

10. The welding device according to claim 7, wherein the welding device further comprises:
   a rotatable current transfer connector attached to the transfer tube, and the transfer tube establishes an electrical current path from the rotatable current transfer connector to the welding tip via the swivel bearing and the pivot tube;
   a welding wire guide is located within the transfer tube for supplying a welding wire to the welding tip via the swivel bearing and the pivot tube; and
   a transfer tube gas conduit is defined between an exterior surface of the welding wire guide and an inwardly facing surface of the transfer tube to supply welding gas to the welding tip via the swivel bearing and the pivot tube.

11. The welding device according to claim 10, wherein the welding device further comprises:
   a first end of a wire/power/gas feed conduit coupled to a wire/power/gas supply, the wire/power/gas feed conduit contains a welding wire guide for supplying the welding wire; defines a gas supply conduit for supplying the welding gas; and defines a conductor for supplying a welding current;
   an opposed end of the wire/power/gas feed conduit coupled to a stationary current transfer connector which engages with the rotatable current transfer connector of the transfer tube such that, when the stationary and the rotatable current transfer connectors engage one another, the welding wire guide facilitates conveying the welding wire to the welding tip, the gas supply conduit facilitates conveying the welding gas to the welding tip, and an electrical path is established with the transfer tube to facilitate conveying the welding current to the welding tip.

12. The welding device according to claim 11, wherein both the wire/power/gas feed conduit and the stationary current transfer connector remain stationary with respect to the housing while the rotatable current transfer connector, the transfer tube, the swivel bearing, the pivot tube and the welding tip all rotate with the spindle when the spindle is driven by the drive mechanism.

13. A welding device for facilitating deposit of a welding bead on a surface to be built-up, the welding device comprising:
   a housing accommodating a rotatable spindle therein;
   a drive mechanism coupled to the spindle to facilitate rotation thereof; and
   a second rider circumscribing the spindle and the second rider being coupled to the drive mechanism, the second rider having an operative mode and an inoperative mode; the second rider, when in the operative mode, engaging with the spindle so as to induce axial movement of the spindle, with respect to the housing, as the spindle rotates with respect to the housing; and
   the second rider, when in the inoperative mode, being disengaged from the spindle so as to slide axially with respect to the spindle without inducing any axial movement of the spindle, with respect to the housing, as the spindle rotates with respect to the housing;
   a first rider circumscribing the spindle, and the first rider being located between the drive mechanism and the second rider; and
   at least one spring located between the first rider and the second rider, and the at least one spring biases the second rider away from the first rider but allows the second rider to move toward the first rider as the at least one spring is compressed.

14. The welding device according to claim 13, wherein the second rider supports a second rider gripper member, the second rider gripper member surrounds the spindle and allows the second rider to move axially with respect to the spindle in one direction of motion but prevents axial movement of the second rider with respect to the spindle a second opposite direction of motion.

15. The welding device according to claim 14, wherein the first rider supports a first rider gripper member, the first rider gripper member surrounds the spindle and allows the spindle to move axially with respect to the first rider gripper member in one direction of motion but prevents axial movement of the spindle with respect to the first rider gripper member in a second opposite direction of motion.

16. The welding device according to claim 14, wherein the second rider has a latch pivotally connected thereto; the latch, when in a first position disengaged from the second gripper member, allows the second rider to engage with the spindle and vertically raise the spindle with respect to the housing during rotation thereof; and the latch, when in a second position engaged with the second gripper member, prevents the second gripper member from engaging with the spindle and raising the spindle with respect to the housing during rotation of the spindle.

17. The welding device according to claim 15, wherein the first rider is mechanically coupled to the spindle so as to be rotatably driven by the spindle, and the second rider is mechanically coupled to the spindle so as to be driven by the spindle.

18. The welding device according to claim 13, wherein the second rider supports a cam member having a cam wheel, and the cam wheel engages with a cam surface of an annular ring to facilitate vertical movement of the spindle, induced by the second rider, as the spindle rotates relative to the housing.

19. The welding device according to claim 18, wherein the annular ring is pivotally supported with respect to the spindle to facilitate adjustment of an inclination angle of the cam surface of the annular ring and control an amount of axial indexing of the spindle relative to the housing during the operative mode of the second rider.

20. The welding device according to claim 13, wherein the drive mechanism further comprises an electric motor which supports a drive sprocket, the spindle supports a driven sprocket, and a drive member interconnects the drive sprocket with the driven sprocket to supply rotation drive to the driven sprocket and rotate the spindle; and
   a support apparatus facilitates mounting of the welding device to a desired surface.

21. The welding device according to claim 20, wherein the motor is coupled to an electric controller and the electric controller facilitates control of a rotational speed of the electric motor, and the electric motor is coupled to the drive sprocket by a torque transfer device to limit an amount of torque transferred to the driven sprocket; and
   the spindle is hollow and has opposed first and second open ends, the spindle supports a transfer tube therein and the transfer tube is connected to a pivot tube by a swivel bearing, and a remote end of the pivot tube supports a welding tip to facilitate welding on a desired surface.

22. A welding device for facilitating deposit of a welding bead on a surface to be built-up, the welding device comprising:

a housing accommodating a rotatable spindle therein;

a drive mechanism coupled to the spindle to facilitate rotation thereof; and a rider for inducing axial spindle movement circumscribing the spindle and the rider for inducing axial spindle movement being coupled to the drive mechanism, the rider for inducing axial spindle movement having an operative mode and an inoperative mode; the rider for inducing axial spindle movement, when in the operative mode, engaging with the spindle so as to induce axial movement of the spindle, with respect to the housing, as the spindle rotates with respect to the housing; and the rider for inducing axial spindle movement, when in the inoperative mode, being disengaged from the spindle so as to slide axially with respect to the spindle without inducing any axial movement of the spindle, with respect to the housing, as the spindle rotates with respect to the housing; and the rider for inducing axial spindle movement moving to and fro with respect to the housing, as the rider for inducing axial spindle movement rotates with the spindle, during both the operative and the inoperative modes of operation.

23. The welding device according to claim 22, wherein the rider for inducing axial spindle movement, during both the operative and the inoperative modes of operation, moves in a first axial direction relative to the housing during a first portion of its rotation, and the rider for inducing axial spindle movement, during a second portion of its rotation, moving in a second direction, relative to the housing, which is opposite to the first direction.

\* \* \* \* \*